(12) United States Patent
Grote et al.

(10) Patent No.: US 11,394,241 B2
(45) Date of Patent: Jul. 19, 2022

(54) RESONATING INDUCTOR FOR WIRELESS POWER TRANSFER

(71) Applicant: DELTA ELECTRONICS (THAILAND) PUBLIC CO., LTD., Samutprakarn (TH)

(72) Inventors: Tobias Grote, Lügde (DE); Philipp Rehlaender, Paderborn (DE); Hugues Njiende T., Paderborn (DE); Sergey Tikhonov, Bad Sassendorf (DE)

(73) Assignee: DELTA ELECTRONICS (THAILAND) PUBLIC CO., LTD., Samutprakarn (TH)

( * ) Notice: Subject to any disclaimer, the term of this patent is extended or adjusted under 35 U.S.C. 154(b) by 0 days.

(21) Appl. No.: 16/997,805

(22) Filed: Aug. 19, 2020

(65) Prior Publication Data
US 2021/0066967 A1     Mar. 4, 2021

(30) Foreign Application Priority Data
Aug. 28, 2019   (EP) ................. 19 194 156.6

(51) Int. Cl.
*H02J 50/12*     (2016.01)
*H01F 27/255*    (2006.01)
*H01F 38/14*     (2006.01)

(52) U.S. Cl.
CPC ............ *H02J 50/12* (2016.02); *H01F 27/255* (2013.01); *H01F 38/14* (2013.01)

(58) Field of Classification Search
CPC ........... H02J 50/12; H02J 7/02; H01F 27/255; H01F 38/14; H01F 2027/2809; H01F 2027/2838; H01F 27/2804; H01F 27/306; H01F 41/00; Y02T 90/14; Y02T 10/7072; Y02T 10/70; B60L 53/12
See application file for complete search history.

(56) References Cited

U.S. PATENT DOCUMENTS 9,240,270 B2 *   1/2016  Wu ........................ H01F 27/363
9,396,867 B2 *   7/2016  Kurs ....................... H01F 38/14
9,716,386 B2     7/2017  Honda et al.
(Continued)

OTHER PUBLICATIONS

European Search Report dated Mar. 3, 2020, 8 pages.

*Primary Examiner* — Jared Fureman
*Assistant Examiner* — Michael J Warmflash
(74) *Attorney, Agent, or Firm* — Vector IP Law Group LLC; Robert S. Babayi

(57) ABSTRACT

The invention relates to a resonator of a wireless power transfer system (1), including a magnetic core in the form of an H-core with two yokes and at least one limb (52) connecting the yokes where a winding (53) is wound on the limb (52) of the core. The winding (53) includes a PCB (56.1) on one side of the limb (52) and a PCB (56.2) on another side of the limb (52) where the turns of the coil are formed by traces on the first PCB (56.1) and on the second PCB (56.2) that are connected to each other by soldering pins (57) that are soldered into corresponding holes of the PCBs (56.1, 56.2). The traces on the PCBs (56.1, 56.2) may be provided on a single conductive layer of the PCBs (56.1, 56.2) or the PCBs may be multilayer PBS, where each turn section between two soldering pins (57) on one of the PCBs (56.1, 56.2) may include several strands including one or more traces on one or more conductive layers.

19 Claims, 3 Drawing Sheets

(56) References Cited

U.S. PATENT DOCUMENTS

| | | | | |
|---|---|---|---|---|
| 2013/0088090 A1* | 4/2013 | Wu | ................. | H01F 27/00 |
| | | | | 336/84 R |
| 2014/0225449 A1* | 8/2014 | Kurs | ................. | H01F 27/2823 |
| | | | | 361/679.01 |
| 2017/0317506 A1* | 11/2017 | Lim | ................. | H02J 50/10 |
| 2019/0065793 A1* | 2/2019 | Kim | ................. | H04B 5/0081 |

* cited by examiner

RESONATING INDUCTOR FOR WIRELESS POWER TRANSFER

TECHNICAL FIELD

The invention relates to an inductor for a resonator of a wireless power transfer arrangement, including a coil arranged on a magnetic core. The invention further relates to a corresponding resonator and a method for building a corresponding inductor.

BACKGROUND ART

Electric vehicles have become more and more popular during the last decades. For reasons of durability and user comfort the drive battery included in such electric vehicles are preferably charged wirelessly. Two inductively coupled coils provide wireless power transfer, while the large stray inductance is compensated by a series resonant capacitor. The system is operated at series resonant frequency. For electric vehicles, the transmitter coil is usually placed on the floor and the receiver coil is attached on the bottom of the vehicle. For charging the vehicle, it is placed above the primary such that the secondary is directly above the primary to pick up as much of the magnetic field produced by the primary.

A corresponding inductive wireless charging system has to overcome possible misalignments between the transmitter coil (TC) and the receiver coil (RC) thereby maintaining a high efficiency. A relatively robust coupling coefficient between the TC and the RC is necessary.

If the RC mounted of the vehicle to be charged is misaligned, such a misalignment in a longitudinal direction of the vehicle (Y-direction) may be compensated comparably well through driving assistance, i.e. by moving the vehicle a bit forwards or backwards. However, a misalignment perpendicular to the Y-direction, designated hereinafter as X-direction, is much more difficult to compensate, as the vehicle may not be easily displaced in a lateral direction.

The primary of such a wireless charging system is therefore usually configured such as to produce a magnetic field that is evenly distributed in the X-direction but that varies in the Y-direction.

Such wireless charging systems may have different core shapes such as a C-core, E-core, H-core, ferrite bars and others as well as different winding structures such as double-D, flat spiral, cylindrical circular or other windings. Different core and winding shapes may have different advantages. It has for example been shown that flat, rectangular cores not only have a low weight and a small footprint, they also have advantages regarding misalignment tolerance.

In order to reduce the height of the secondary of such a vehicle charging system it has been suggested to use flat cores and planar windings or even printed circuit boards (PCBs) including the windings. However, such flat resonators may result in high flux densities caused by skin and proximity effects and accordingly in unwanted losses that reduce efficiency of the system.

Often, such chargers are equipped with further elements such as blocking elements to block leakage fields or resonators and the like. Such additional elements not only increase the costs of the device but also complicate the manufacturing process.

The following documents disclose some examples of such charging systems.

Document US 2013/0088090 A1 discloses such a magnetic coupler for wireless power transfer. The coupler for example includes an H core 43 and a coil 42 of litz wire wound on the middle leg of the H core 43. In order to block or repel unwanted leakage fields, the coupler further includes a screen 41 made of suitable materials or metamaterials including PCB coils, litz wire or low-loss PCB dielectrics.

Document U.S. Pat. No. 9,716,386 B2 discloses another contactless power supply system with a primary coil 12, a secondary coil 13 and a resonance coil 14 which is provided in addition to the secondary coil and is in direct contact with the secondary winding and arranged between the primary and the secondary windings. The primary coil 12 and the secondary coil 13 are made of a litz wire.

US 2017 317506 A1 discloses a thin film coil for a charger 20 with a power transmission apparatus 200 or a mobile device 10 with a battery 12 and a power reception apparatus 100. The power reception apparatus 100 includes a flat, plate- or sheet-like magnetic unit 120 that is attached to a thin film coil 110 by means of a bonding unit 140. The thin film coil 110 includes a substrate 112 for example in the form of a flexible printed circuit board (FPCB) that carries the coil patterns 113. The coil patterns may for example have a spiral shape on the plane formed by the substrate 112 where the coil patterns 113 may include a plurality of coil strands 117, 118. Vias 114 may be used to connect the strands in parallel.

SUMMARY OF THE INVENTION

It is the object of the invention to create an inductor for a resonator of a wireless power transfer arrangement pertaining to the technical field initially mentioned, that results in a reduced height of the resonator and may be produced at reasonable costs.

It is a further object of the invention to create a corresponding resonator, a corresponding wireless power transfer arrangement and a corresponding method for making such an inductor.

The solution of the invention is specified by the features of claim 1. According to the invention at least one turn of the coil of the resonator includes

- a first turn section including a trace of a first PCB arranged on one side of the magnetic core,
- a second turn section including a trace of a second PCB arranged on another side of the magnetic core,
- a third turn section connecting a second end of the first turn section and a first end of the second turn section and
- a linking section connecting said at least one turn to a terminal of the coil or to a neighbouring turn.

The traces on the PCBs as well as the third turn section and the linking section are made of an electrically conductive material. The traces are for example made of copper In this way, a solenoid coil is formed where at least one turn of the coil is wound around the magnetic core.

Usually, the coil includes a plurality of turns such that the linking section of almost all turns connects the respective turn to for example the following neighbouring turn. However, the linking section of the last turn of the coil connects the coil to a terminal of the coil. Thereby, the linking section may also serve as the coils terminal.

Similarly, one of the turn sections of the first turn forms or is connected to another terminal of the coil, for example the first end of the first turn section.

Accordingly, the first PCB includes the first turn section of all turns of the coil where these first turn sections are provided on the first PCB as known in the art resulting in a simple and cost-effective way to manufacture the PCB. The second PCB similarly includes the second turn section of all turns of the coil and may therefore also be manufactured in a simple and cost-effective way.

As known in the art, a PCB usually is a flat piece of single or multilayer substrate including conductive tracks or traces, pads and/or other features that are typically etched from one or more layers of conductive material such as copper foil or the like provided on the surfaces of the PCB or within the PCB, and where electrical and/or electronic components are connected to the PCB to form a desired circuit.

Using such PCB-windings has several advantages such as for example a low weight, a small footprint and a low height of the resulting inductor or resonator respectively. Furthermore, resonant capacitors or other additional electric or electronic components, if needed, can be directly attached to the PCB.

Generally speaking, the magnetic core may also include more than one coil. The coil may for example be a split coil wound on the same or different core segments. It is however preferred that the magnetic core includes just single coil.

Such an inductor is particularly useful in the secondary of a wireless charger of an electric vehicle. As the secondary resonator is mounted at or in the vehicle, the space required at or in the vehicle can be minimised and due to the light weight, the additionally required energy to move the vehicle including the resonator can be kept very low.

The electric vehicle may for example be a car, lorry, motorbike, train, boat, ship, plane, helicopter and the like but also an industrial vehicle such as a forklift, AGV (automated guided vehicle), cleaning machine, elevator and the like or an electrically operated equipment for lifting, displacing or transporting goods of any kind.

However, the resonator according to the invention may be used in many different applications where electrically driven devices, items or objects are not permanently connected to a source of electrical power but are equipped with one or more batteries for operation. Examples are mobile devices such as cell phones, PDAs (personal digital assistants), tablet computers and the like.

As already outlined above, the magnetic core may have many different shapes. However, in a preferred embodiment of the invention the magnetic core includes two yoke elements and at least one limb element magnetically connecting the yoke elements and wherein the coil is arranged on the at least one limb element. The yoke elements are usually arranged essentially parallel to each other whereas the limb element is usually arranged essentially perpendicular to the yoke elements. To serve as a magnetic core, the yoke and limb elements are advantageously made of a ferromagnetic material, preferably of ferrite.

In its simplest form, i. e. with a single limb element, the magnetic core is an H-core. If the core has two or more limb elements the core has a ladder structure where usually a winding is wound on each limb element. Such a ladder structure of the core is particularly useful in high power applications. Unless otherwise mentioned, the plural "limb elements" as used in this application shall also include the case where the magnetic core just includes a single limb element.

The magnetic core in this example is arranged at or in the electric vehicle such that the limbs are parallel to the Y-direction and the yokes are parallel to the X-direction.

Generally, the yoke and limb elements may have any desired shape. Usually they are long compared to their thickness and width. They may for example have an irregular cross section with thicker and thinner as well as convex and/or concave sections. They may also have a regular cross section such as a polygon with sharp or rounded edges or they may have an oval, circular or elliptic cross section. The yoke and the limb elements may also have the same or different cross sections and shapes.

In a preferred embodiment of the invention, the at least one limb element has an essentially rectangular cross section where the height of the limb is much smaller than its width. And the height of the limb is also much smaller than its length. The particular height, width and length of the limb element depend on the particular application and may suitably be chosen. This means that the limb has a strip-like or band-like shape of a certain width where the upper and lower surfaces are generally planar and parallel to each other. Such a shape helps to reduce the height of the whole resonator which is important in certain applications. In this example, the first and the second PCB are arranged in parallel to the limb element, which further reduces the height of the resonator because one or more layers of the first and/or second turn sections may be provided within a single, thin and flat PCB having one or more layers. In this connection, the term parallel means that the PCBs are arranged such that their parallel upper and lower surfaces are parallel to the upper and lower surface of the limb element. Accordingly, the PCBs are also parallel to each other.

As already mentioned, the yoke elements may have a completely different shape than the limb elements. In a preferred embodiment, the yoke elements however have a similar shape as the limb elements, i. e. they also have a generally rectangular cross section where the height of the limb is much smaller than its width. The yoke elements are usually longer than the limb elements. And they typically also differ in height and width of their cross sections. But their height or their width or even both may also be the same for the yoke and the limb elements.

The third turn section and the linking section complement each single turn of the coil. The third turn section connects the first and the second turn sections and the linking section connects that turn to the following turn or to a terminal. The third turn sections as well as the linking sections may for example be realized by wires that are soldered or otherwise electrically connected to the respective ends of the first and second turn sections. The wire may be a single or multi-strand. Such interconnections would however require a rather high production effort.

In a preferred embodiment of the invention, both the third turn section and the linking section include a soldering pin. Accordingly, such a soldering pin extends from the first PCB to the second PCB and interconnects the traces thereon to form the coil.

Soldering pins are generally known in the art. A soldering pin typically is soldered or pressed into a via of a PCB thereby establishing an electrical connection between the soldering pin and one or more traces of the PCB. The part of the pin protruding the PCB is then used as a terminal to connect other components to the one or more traces. A soldering pin may also be soldered onto a pad of a PCB to electrically connect to a trace on the PCB. Such soldering pins are usually thin, pin-shaped pieces of electrical material such as copper, aluminium, iron or the like. They are often sold in an assembled form where multiple pins are inserted into holes of a supporting structure, usually designated as pin headers, where the holes are arranged in one or more rows and where the arrangement of the pins corresponds to a grid pattern of the PCBs.

Accordingly, such a soldering pin in this preferred embodiment is soldered or pressed into corresponding vias on the first and the second PCB to form the turns of the coil. Each soldering pin that forms a third turn section electrically connects the second end of the first turn section and the first end of the second turn section. And each soldering pin that acts as a linking section electrically connects two neighbouring turns, directly serves as a terminal of the coil or is connected to a terminal of the coil.

In a further preferred embodiment of the invention the whole magnetic core is made from thin, flat, strip-like elements and the sections of the coil that are arranged parallel to the surface of the magnetic core are provided within two PCBs that are arranged parallel to the magnetic core. The distance between the PCBs therefore roughly corresponds to the thickness of the limb core element. The third turn sections and the linking sections then are formed by the soldering pins that extend between the PCBs. In this way, an inductor for a resonator of a wireless power transfer arrangement can be provided which has a reduced height and which is rather simple and therefore cost-effective to produce. Accordingly, not only the inductor but the whole resonator has a reduced height and is simple and cost-effective to produce.

Preferably, such a resonator is used in the secondary of a wireless charger for electric vehicles, because the secondary with the receiver coil is usually attached to the bottom or integrated into the bottom of the vehicle. In order to utilize as little space of the vehicle as possible, the secondary should be made as thin as possible. As the primary of such a charger typically is placed on the floor, the height of the primary is not as critical as that of the secondary. The same is true for vehicles, where the secondary is for example mounted vertically at the vehicle and where the primary is for example attached on a wall or integrated into a wall. In such cases the secondary should also be as thin as possible.

Another advantage of such a resonator is their reduced weight that results from the compact and thin design of the inductor. The lower the weight of such a resonator in the secondary, the less energy is necessary to drive the vehicle that carries the secondary.

Depending on the application, the coil may have any desired number of turns. The coil may just include a single turn or a low number of turns such as for example three, four or five turns. The coil may however also have a high number of turns such as for example up to several hundreds of turns. In a preferred embodiment of the invention the coil has a number of turns that is at least two and below 30. In a more preferred embodiment, the number of turns is above 5 and below 20, and in an even more preferred embodiment, the number of turns is above 7 and below 14. Such an inductor may for example be used in a charger for electric vehicles.

Each first turn section, i. e. the turn section on the first PCB, may for example be realized by a single trace that connects the first and the second end of that first turn section. Such a connection is also designated as a strand hereinafter.

However, in a preferred embodiment of the invention, the first turn section includes at least two strands arranged between the first and the second end of the first turn section and each strand includes a trace of the first PCB. In this way, each first turn section includes at least two electrical connections between the first and the second end of that first turn section. This results in a planar litz structure for each first turn section.

Similarly, each second turn section, i. e. each turn section on the second PCB, may be realized by a single strand that connects the first and the second end of that second turn section.

But in a preferred embodiment of the invention, the second turn section includes at least two strands arranged between the first and the second end of the second turn section and each strand includes a trace of the second PCB. In this way, each second turn section includes at least two electrical connections between the first and the second end of that second turn section. This again results in a planar litz structure for each second turn section.

The number of strands of each first or second turn section may be chosen independently of each other such that not all first turn sections do have to have the same number of strands. And not all second turn sections do have to have the same number of strands.

But in a preferred embodiment of the invention, the number of strands of the first and second turn sections is the same.

Using such planar litz structures for the first and the second turn sections results in an inductor for a resonator of a wireless power transformer with reduced power losses due to skin and proximity effects.

In another preferred embodiment of the invention, the first and the second PCB include multiple layers, i. e. at least two layers, wherein each layer comprises at least one trace and wherein each strand includes a trace on at least two layers of a PCB. The first and the second PCB further include vias to connect the traces on different layers to each other to form the strand. In this way multiple strands may be provided on or within the PCB in a space-efficient way one upon the other and side by side.

As the single strands of a turn section are isolated against each other by the air or the substrate of the PCB, the losses due to the skin effect may further be reduced.

If the number of strands of the first and second turn sections is not too high, a single layer PCB might also be used. In such a case, the strands may be arranged side by side, for example as parallel traces on one single conductive layer. However, in applications with a high magnetic flux of the wireless power transfer results in high frequency losses which often prevents use of simple flat PCB conductors.

By using such litz structures, the high frequency losses may be further reduced significantly, i. e. up to 50% in certain embodiments.

In a further preferred embodiment of the invention, each strand includes at least two traces on each of said at least two layers of a PCB. The traces on a single are not directly connected to each other, neither by a further trace on the same layer of the PCB nor by a wire, another conductor or the like. Rather, they are connected to each other indirectly. I. e. two traces on the same layer of the PCB are connected to each other by one or more traces on one or more different layers of the PCB and corresponding vias to interconnect the PCB layers. And the traces are preferably arranged and connected to each other by vias such as to form twisted strands. Accordingly, in such a preferred embodiment, one, more or even all of the first and second turn sections include multiple, twisted strands.

In such transposed strands, two consecutive trace segments of a particular strand are not only arranged on different layers of the PCB but they are also laterally displaced. This means that they generally run parallel to each other but they are laterally offset. This may for example be achieved by vias that are inclined, i. e. they are not perpendicular to the PCB surface, or by perpendicular vias where one of the trace segments includes an angled section, that is a section that deviates from the main direction between the ends of a first or second turn section.

By such a transposition of the strands, the mutual influence of the single strands may be reduced.

Inductor according to any one of claims 6-9 wherein the traces have a height between 50 μm and 200 μm, preferably between 80 μm and 150 μm and even more preferably between 100 μm and 120 μm.

In a typical application such as for example a wireless charger for electric vehicles, the secondary as a module to be installed at or within the vehicle has a length and a width in the order of some centimeters to some decimeters where these dimensions are primarily due to the dimensions of the resonator, i. e. the magnetic core with the winding.

Using an H-core for the secondary of such a resonator, the limb has for example a width between 5 cm and 30 cm, a length between 10 cm and 50 cm and a thickness between 3 mm and 3 cm.

In such a preferred embodiment of the invention, the number of turns of the coil wound around the limb of the H-core is between 8 and 12.

Then, the traces on the PCBs preferably have a height between 50 μm and 200 μm. More preferably they have a height between 80 μm and 150 μm and even more preferably their height is between 100 μm and 120 μm.

And the traces preferably have a width between 200 μm and 1000 μm.

As mentioned above, the magnetic field generated by the primary of the charging system usually varies in Y-direction. But the magnetic field does not only vary in Y-direction, but it also varies in Z-direction, i. e. the direction perpendicular to the Y-direction and the X-direction.

Accordingly, if an H-core or a ladder-core with a coil wound on a limb as described above is positioned above the primary side such that the limb or limbs are parallel to the Y-direction, the magnetic flux in the turn sections of the RC that are closer to the TC, the bottom turn sections, is higher than the magnetic flux in the turn sections of the RC that are farther away from the TC, the top turn sections.

In another preferred embodiment of the invention, the width of the second turn section of a particular turn is equal to or smaller than the width of the first turn section of that turn.

Depending on the application and the desired features of a wireless charger, the width of the two turn section may of course also be made equal or the width of the bottom turn sections may even be greater than that of the top turn sections.

As seen above, the magnetic flux varies in Y-direction and therefore usually is different for different turns of a coil. The magnetic field generated by the primary in Y-direction is typically smaller in the centre and becomes higher outwardly. Accordingly, if the secondary is correctly aligned in Y-direction, the magnetic field at the centre, i. e. the inner turns of the coil is typically smaller than the magnetic field towards the ends, i. e. the outer turns of the coil.

And as a smaller width of the traces is beneficial for a higher flux density, in a further preferred embodiment of the invention, the width of the traces of the first turn section of an outer turn of the coil is higher than the width of the traces of the first turn section of an inner turn of the coil and the width of the traces of the second turn section of an outer turn of the coil is higher than the width of the traces of the second turn section of an inner turn of the coil.

However, depending on the particular application, the dimensions of the secondary and also the dimensions of the traces may also be less or greater than those mentioned above.

As mentioned above, apart from the coil, the resonant circuit may also include further circuit components such as for example resonant capacitors for a reactive power compensation.

In another preferred embodiment of the invention, at least one of the first or the second PCB therefore includes circuit components electrically connected to the coil. Such components may for example be mounted on the PCB using the through-hole technology or, preferably, surface mounting is used to solder SMD (surface-mounted devices) directly on the surface of a PCB.

A resonator according to the invention, i. e. a resonator for a wireless power transfer arrangement, includes an inductor as described above including a magnetic core with a winding, wherein the winding is arranged on the core as described.

It is however clear for one skilled in the art that such a resonator may also include further elements and components. For example, the resonating circuits may also include further resonating components such as capacitors or resistors.

In a wireless power transfer arrangement according to the invention, i. e. a wireless power transfer arrangement for a wireless power transfer from a primary resonator across an airgap to a secondary resonator, the primary resonator or the secondary resonator includes an inductor as described above including a magnetic core with a winding, wherein the winding is arranged on the core as described.

Again, it is clear for one skilled in the art that such a resonator may also include further elements and components. For example, the resonating circuits may also include further resonating components such as capacitors or resistors.

In a preferred embodiment of the wireless power transfer arrangement the secondary resonator includes the resonator. This is particularly beneficial as most of the advantages of such a resonator including a reduced weight, a small footprint, a reduced height and an enhanced efficiency are most effective in the secondary that is attached or integrated into the electric vehicle.

Such a wireless power transfer arrangement usually includes further elements or components such as for example a power input for receiving an input power, an input stage for converting the input power to a primary AC power that is fed to the primary resonator which produces the magnetic field. The secondary side usually includes the secondary resonator for converting the power received through the magnetic field to a secondary AC power and an output stage for converting the secondary AC power to an output power that is provided at the output of the wireless power transfer arrangement for further use. And the wireless power transfer arrangement usually further includes a controller for controlling the power transfer from the primary to the secondary.

A method according to the invention, i. e. a method for making an inductor for a resonator of a wireless power transfer arrangement, includes the steps of arranging a first PCB having at least one trace on one side of a magnetic core, arranging a second PCB having at least one trace on another side of the magnetic core and providing a turn of the coil by
  using a trace of the first PCB as a first turn section of the turn,
  using a trace of the second PCB as a second turn section of the turn,
  providing a third turn section of the turn by connecting a second end of the first turn section to a first end of the second turn section and connecting said turn to a terminal of the coil or to a neighbouring turn, preferably to a first end of a first turn section of a neighbouring turn.

Other advantageous embodiments and combinations of features come out from the detailed description below and the entirety of the claims.

BRIEF DESCRIPTION OF THE DRAWINGS

The drawings used to explain the embodiments show.

In the figures, the same components are given the same reference symbols.

PREFERRED EMBODIMENTS

Figure 1:
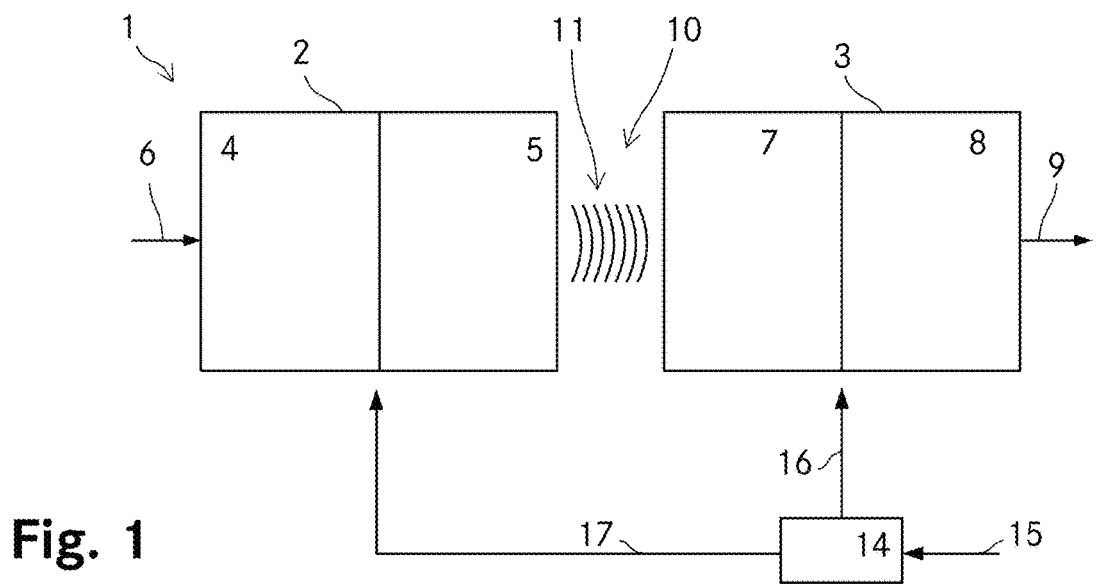
FIG. 1 a schematic representation of a wireless power transmission system.

FIG. 1 shows a schematic representation of a wireless power transmission system 1. The wireless power transfer system 1 includes a primary side 2 and a secondary side 3 to transfer power across an air gap 10. The primary side 2 includes an input stage 4 and a primary resonator 5. The input stage converts an input power 6 into an AC primary power that is fed to the primary resonator 5. The resonator 5 induces a magnetic field 11 to wirelessly transmit power across the airgap 10. The secondary side 3 includes a secondary resonator 7 and an output stage 8. The secondary resonator 7 picks up the magnetic field 11, converts the power received through the magnetic field 11 into an AC secondary power and feeds it to the output stage 8. The output stage 8 finally converts the AC secondary power to an output power 9 that is provided at an output of the wireless power transfer system 1.

The wireless power transfer system 1 further includes a controller 14 that receives input signals 15, and based on these input signals 15 provides control signals 16, 17 to control the power transmission of the wireless power transmission system 1. Whereas the controller 14 is shown to be a separate unit it may also be integrated into any of the units shown in FIG. 1. It may also be split into two or more controller units to perform the different control task within the wireless power transmission system 1.

The input power 6 for example is an AC power and the input stage 4 for example includes a converter for converting the AC input power 6 to the AC primary power fed to the primary resonator 5. The output stage 8 for example includes a converter for converting the AC secondary power received from the secondary resonator 7 into a DC output power 9. Then, the DC output power 9 is used to charge the energy storage of an electric vehicle or to provide it to any other power consuming device that is either a part of the vehicle or not.

The primary side 2 usually is installed on the floor or on a wall of a charging station and the secondary side 3 is installed within or attached to a vehicle. To charge the energy storage such as for example the drive battery of such an electric vehicle, the vehicle is positioned near the primary side 2 such that the secondary side 3 is arranged within the magnetic field 11 produced by the primary side 2 to pick up that magnetic field 11.

Figure 2:
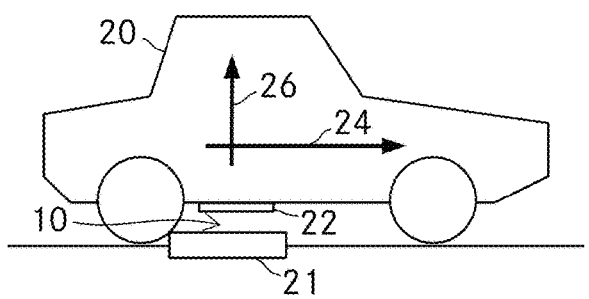
FIG. 2 a schematic representation of an electric vehicle and a charger for charging the vehicle in a side view.
Figure 3:
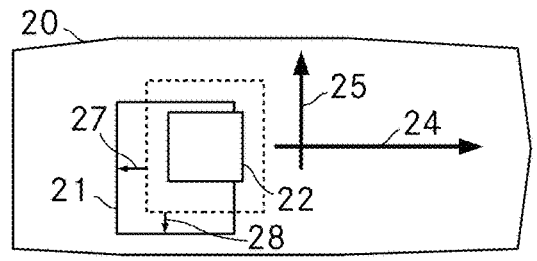
FIG. 3 a schematic representation of the electric vehicle and charger shown in FIG. 2 in a top view.

FIGS. 2 and 3 show a schematic representation of an electric vehicle 20 and a charger for charging the vehicle 20. The primary resonator with the transmitter coil 21 is arranged on the floor and the secondary resonator with the receiver coil 22 is attached to the bottom of the vehicle 20. The vehicle 20 is positioned on the floor such that the receiver coil 22 is directly above the transmitter coil 21 with an air gap 10 in Z-direction 26 in between. Since it is very difficult to optimally position the vehicle 20 above transmitter coil 21, there is usually a misalignment 27 in Y-direction 24 and a misalignment 28 in X-direction 25.

Misalignment in this connection means that the transmitter coil 21 and the receiver coil 21 are not optimally aligned such that the transmission efficiency is below the maximally achievable transmission efficiency with an optimal alignment. The misalignment 27 in Y-direction 24 may be compensated by moving the vehicle a bit backwards. However, to reduce the misalignment 28 in X-direction 25 the vehicle 20 would have to be moved sideways in a precise manner. But this is difficult as the vehicle first has to be moved in the Y-direction for a larger distance with a slight curve and then moving back above the transmitter coil 21.

To avoid such inaccurate movements of the vehicle, the primary resonator is produced such that it typically produces a magnetic field that more or less extends uniformly in a comparably wide area in the X-direction and such that the flux density in a receiver coil does not vary significantly due to a misalignment in X-direction. The flux density in the receiver coil due to a misalignment in Y-direction usually varies much more and moves the maximum flux density to one side of the receiver coil.

Figure 4:
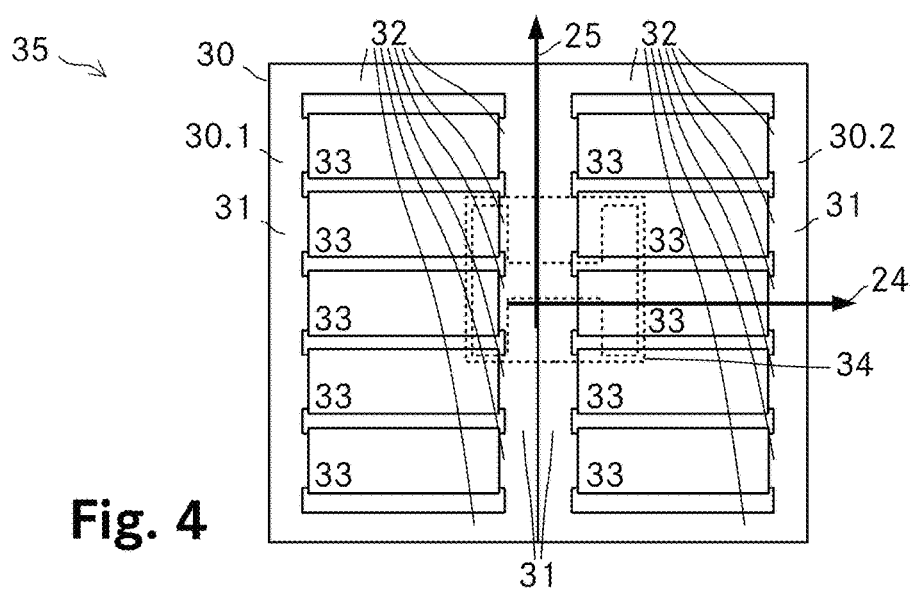
FIG. 4 a schematic representation of a primary resonator in a top view.

FIG. 4 shows a schematic representation of an exemplary implementation of a primary resonator 35. The resonator 35 includes a magnetic core 30 made up of two core parts 30.1, 30.2 arranged side by side. Each core part 30.1, 30.2 includes two yokes 31 and a number of limbs 32 extending between the yokes 31. Whereas most limbs do carry a coil 33, the uppermost limb and the lowermost limb 32 of each core part 30.1, 30.2 do not carry a coil but form a rectangular frame together with the two yokes 31 of a core part 30.1, 30.2. The coils 33 are connected to each other or an AC power such as to produce the magnetic field in the Z-direction, i. e. extending perpendicular to the drawing plane of FIG. 4 (not shown).

FIG. 4 further shows a secondary side 34 with an H-shaped magnetic core in dashed lines. As can be seen, due to the structure of the primary resonator 35 a misalignment of the secondary side 34 in the X-direction 25 does hardly have an effect on the flux density within the secondary side 34 whereas a misalignment in the Y-direction 24 has a much larger effect on the flux density within the secondary side 34.

Figure 5:
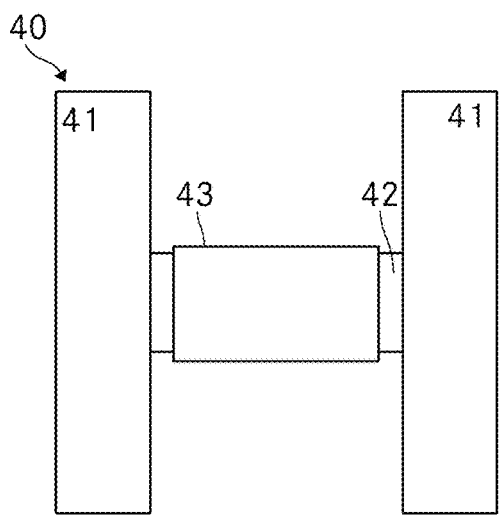
FIG. 5 a schematic representation of a secondary resonator of a wireless charger in a top view.
Figure 6:
FIG. 6 a schematic representation of the resonator shown in FIG. 5 in a side view.

FIGS. 5 and 6 show a schematic representation of a secondary resonator 40 of a wireless charger. FIG. 5 shows the secondary resonator 40 in a top view and FIG. 6 does show it in a side view. The secondary resonator 40 includes an H-core with two yokes 41 and a limb 42 that extends between the yokes 41. A coil 43 is wound on the limb 42.

The yokes 41 and the limb 42 are arranged in the same plane and such that the limb 42 precisely fits between the yokes 41.

Figure 7:
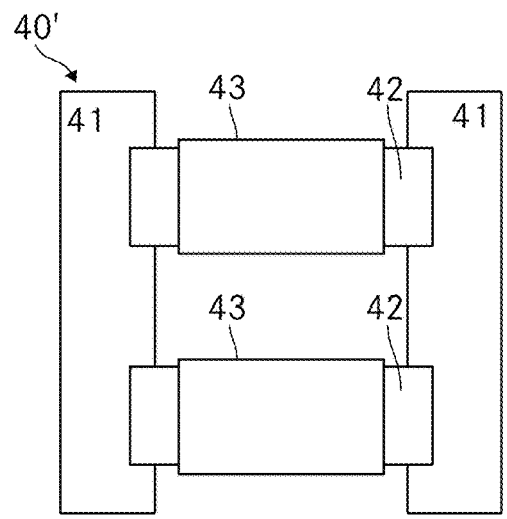
FIG. 7 a schematic representation of another secondary resonator of a wireless charger in a top view.
Figure 8:
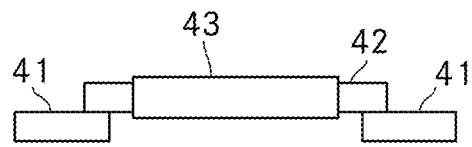
FIG. 8 a schematic representation of the resonator shown in FIG. 7 in a side view.

FIGS. 7 and 8 show a schematic representation of a secondary resonator 40' of a wireless charger. FIG. 7 shows the secondary resonator 40' in a top view and FIG. 8 does show it in a side view. The secondary resonator 40' is rather similar to the one shown in FIGS. 5 and 6 and includes a ladder shaped core with two yokes 41. Contrary to the core shown in FIG. 5, 6 the core in this example includes two limbs 42 that extend between the yokes 41. Again, a coil 43 is wound on each of the limbs 42.

Another difference to the resonator shown in FIG. 5, 6 is that the yokes 41 and the limbs 42 are not arranged in the same plane but the limbs 42 are arranged above the yokes 41. However, the position of the limbs 42 in relation to the yokes 41 is independent of the number of limbs of the core.

Figure 9:
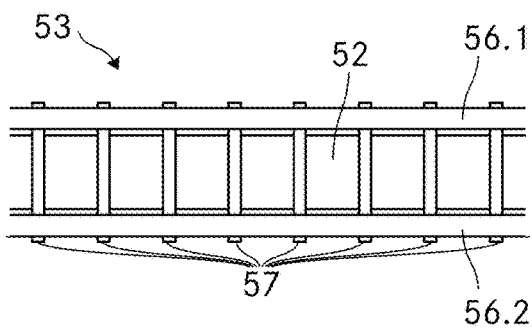
FIG. 9 a schematic representation of a coil wound around a core section of a core of a secondary resonator.

FIG. 9 shows a part of a schematic representation of a coil 53 wound around a limb 52 of a core of a secondary resonator. The secondary resonator includes a first PCB 56.1 arranged above the limb 52 and a second PCB 56.2 arranged below the limb 52. And the secondary resonator includes a number of soldering pins 57 soldered into corresponding holes of the PCBs 56.1, 56.2. Whereas only one row of soldering pins 57 is shown in FIG. 9 in front of the limb 52, it is to note that a second row of soldering pins 57 is provided behind the limb 52 but not visible in FIG. 9. Each of these soldering pins 57 connects a trace on one of the PCBs 56.1, 56.2 with a trace on the other one of the PCBs 56.1, 56.2 and each trace on one of the PCBS 56.1, 56.2 connects a soldering pin 57 in the row in front of the limb 52 with a soldering pin 57 in the row behind the limb 52. In this way, a coil is formed that is wound around the limb 52. In other words, the traces on the upper PCB 56.1 form the first turn segments as mentioned above, the traces on the lower PCB 56.2 form the second turn segments and the soldering pins 57 form the third and the linking segments of the turns of the coil.

Each electrical connection between two soldering pins 57 provided by traces on the PCBs 56.1, 56.2 may include one or more conductive paths between the two soldering pins 57 as shown further below.

Figure 10:
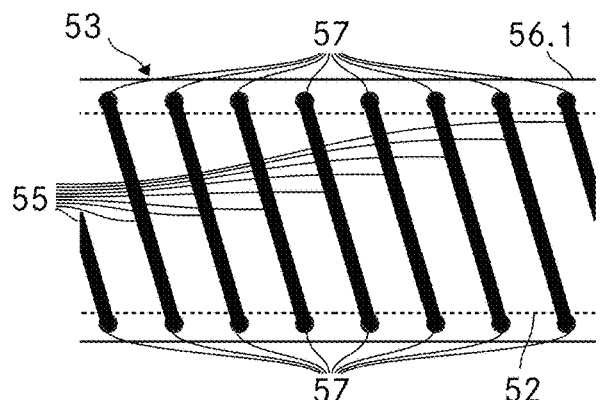
FIG. 10 a schematic representation of a top PCB carrying turn sections of a coil.

FIG. 10 shows a schematic representation of a possible layout of the first turn sections 55 on the top PCB 56.1 of the coil 53 as shown in FIG. 9.

The limb 52 is shown in dashed lines and the soldering pins 57 are shown as circular discs where one of the soldering pins 57 on one side of the limb 52 is connected by a first turn section 55 to another one of the soldering pins 57 on the other side of the limb 52. In this example, each of the first turn sections 55 does connect a particular soldering pin 57 on one side of the limb 52 with the soldering pin 57 on the other side of the limb 52 that is adjacent to the soldering pin 57 that is directly vis-à-vis that particular soldering pin 57. In this way, the first turn sections 55 are slightly inclined and parallel to each other.

Again, each electrical connection on PCB 56.1 between two soldering pins 57, i. e. each first turn section 55 may include one or more conductive paths between the two soldering pins 57 as shown further below.

Figure 11:
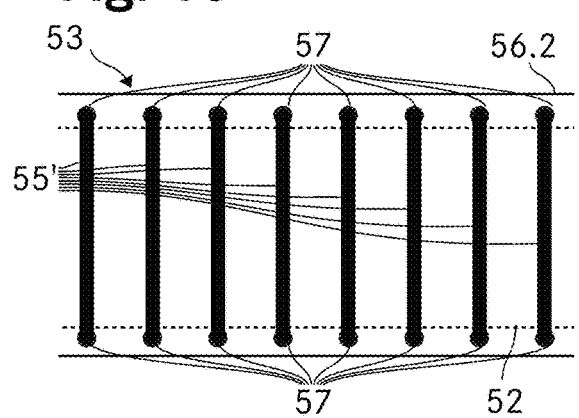
FIG. 11 a schematic representation of a bottom PCB carrying turn sections of a coil.

And FIG. 11 shows a schematic representation of a possible layout of the second turn sections 55' on the bottom PCB 56.2 of the coil 53 as shown in FIG. 9.

The limb 52 is shown in dashed lines and the soldering pins 57 are shown as circular discs where one of the soldering pins 57 on one side of the limb 52 is connected by a second turn section 55' to another one of the soldering pins 57 on the other side of the limb 52. In this example, each of the second turn sections 55 does connect a particular soldering pin 57 on one side of the limb 52 with the soldering pin 57 directly vis-à-vis that particular soldering pin 57. In this way, the first turn sections 55 are parallel to each other and perpendicular to the longitudinal direction of the limb 52.

And again, each electrical connection between two soldering pins 57, i. e. each second turn section 55' may include one or more conductive paths between the two soldering pins 57 as shown further below.

Figure 12:
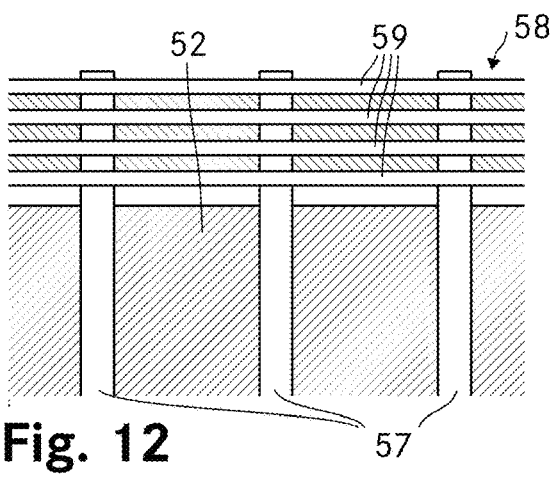
FIG. 12 a schematic representation of an enlarged view of a part of another resonator.

FIG. 12 shows a schematic representation of an enlarged view of a part of another resonator. FIG. 12 shows a PCB 58 arranged above a limb 52. The PCB 58 is a multilayer PCB with four conductive layers 59 where each of these conductive layers 59 includes a number of traces. The resonator further includes a number of soldering pins 57 arranged on either side of the limb 52 and soldered into holes of the PCB 58. Each of the soldering pins 57 connects one or more traces on one or more layers 59 of the PCB 58 with one or more traces on one or more layers of another single or multilayer PCB below the limb 52.

And furthermore, each soldering pin 57 on one side of the PCB 58 is connected by one or more strands to a soldering pin 57 on the other side of the PCB 58, wherein each strand may include one or more traces on one or more layers 59 of the PCB 58 and wherein two consecutive traces on different layers 59 are connected to each other by vias within the PCB 58.

Accordingly, each electrical connection between two soldering pins 57 provided by traces on the PCB 58 may include one or more conductive paths between the two soldering pins 57.

Figure 13:
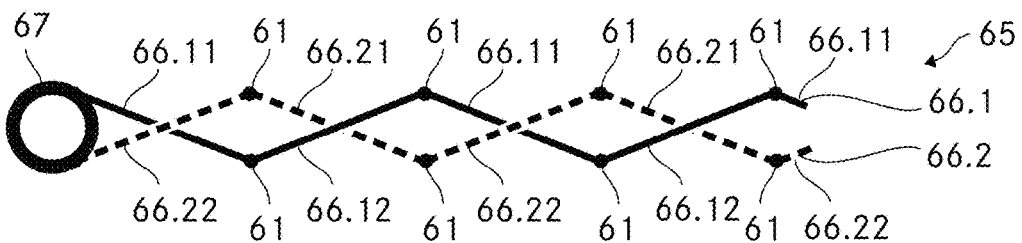
FIG. 13 a schematic representation of a turn section with two strands.

FIG. 13 shows a schematic representation of a part of a first or second turn section 65 on a two layer PCB. The PCB is not shown in this example. The turn section 65 includes two strands 66.1, 66.2 both starting at the same soldering pin 67 having a circular cross section in this example. The first strand 66.1 is shown in a continuous line and the second strand 66.2 is shown in a dashed line.

The first strand 66.1 includes a number of trace segments 66.11 on the first conductive layer of the PCB and a number of trace segments 66.12 on the second conductive layer of the PCB where these trace segments are connected to each other by vias 61 that are arranged in two rows, an upper row and a lower row. The first trace segment 66.11 on the first conductive layer starts at the soldering pin 67 and is connected to the following trace segment 66.12 on the second layer by a first via 61 in the lower row. That trace segment 66.12 is connected to the following trace segment 66.11 by a via in the upper row and so on.

Similarly, the second strand 66.2 includes a number of trace segments 66.21 on the first conductive layer of the PCB and a number of trace segments 66.22 on the second conductive layer of the PCB where these trace segments are connected to each other by vias 61. The first trace segment 66.22 on the second conductive layer starts at the soldering pin 67 and is connected to the following trace segment 66.21 on the first layer by a first via 61 in the upper row. That trace segment 66.21 is connected to the following trace segment 66.22 by a via in the lower row and so on.

The trace segments 66.11, 66.12, 66.21, 66.22 are designed as straight traces between the vias 61.

Accordingly, both strands 66.1, 66.2 run back and forth between the two rows of vias as well as up and down between the two conductive layers to form a stranded trace section between the soldering pin 67 and another soldering pin on the other side of the limb (both not shown).

In this example, the first conductive layer is arranged below the second conductive layer such that trace segments on the second layer are positioned above the trace segments on the first layer which is shown by interrupted lines of the trace segments on the first layer.

Figure 14:
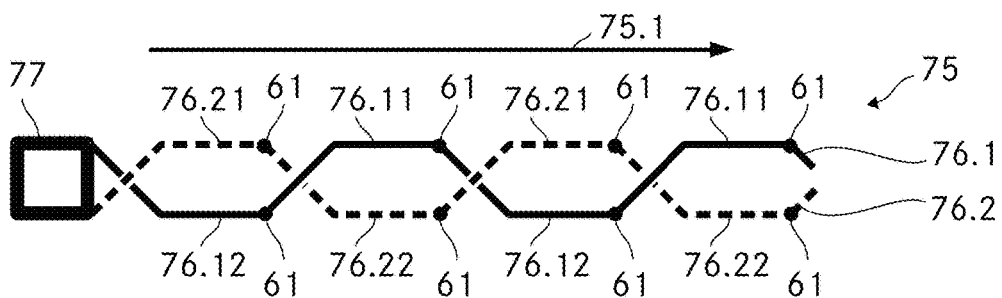
FIG. 14 a schematic representation of another turn section with two strands.

FIG. 14 shows a schematic representation of another example of a turn section 75 with two strands 76.1, 76.2. Starting at the soldering pin 77, the turn section 75 runs in the general direction 75.1 to another soldering pin (not shown). The turn section 75 is rather similar to the one shown in FIG. 13 but includes two major differences to the turn section 65 of FIG. 13. The first difference is that the soldering pin 77 has a rectangular cross section. In fact, the soldering pin may generally have any suitable cross section to best connect the strands on one PCB to the strands on the other PCB. The other difference is the shape of the trace segments between the vias. Whereas the trace segments 76.11, 76.12, 76.21, 76.22 of the example shown in FIG. 13 are designed as straight traces, the trace segments 76.11, 76.12, 76.21, 76.22 are not straight connections between the vias but include two straight parts including an angle.

Starting at the soldering pin 77, the first trace segment 76.12 of the first strand 76.1 includes two segment parts on the first conductive layer wherein the first segment part is inclined and runs from the level of the upper row of vias 61 to the level of the lower row of vias 61 at an angle of for example 20° to 80° with respect to the direction 75.1. The second segment part runs parallel to the direction 75.1 to the first via 61 in the lower row. The following trace segment 76.11 of the first strand 76.1 includes two segment parts on the second conductive layer wherein the first segment part is inclined and runs from the via 61 in the lower row to the level of the upper row of vias 61 at an angle of for example 20° to 80° followed by the second segment part that runs parallel to the direction 75.1 to the second via 61 in the upper row and so on.

The first trace segment 76.21 of the second strand 76.2 includes two segment parts on the second conductive layer wherein the first segment part is inclined and runs from the level of the lower row of vias 61 to the level of the upper row of vias 61 at an angle of for example 20° to 80° with respect to the direction 75.1. The second segment part runs parallel to the direction 75.1 to the first via 61 in the upper row. The following trace segment 76.22 of the second strand 76.2 includes two segment parts on the first conductive layer wherein the first segment part is inclined and runs from the via 61 in the upper row to the level of the lower row of vias 61 at an angle of for example 20° to 80° followed by the second segment part that runs parallel to the direction 75.1 to the second via 61 in the lower row and so on.

The angles of the inclined segment parts may be different for some or even all of the trace segments 76.11, 76.12, 76.21, 76.22 of the strands 76.1, 76.2. The angles preferably are however the same for all inclined segment parts where the angle of the inclined parts running from the level of the upper row of vias 61 to the level of the lower row of vias 61 have the opposite sign compared to the angle of the inclined parts running from the level of the lower row of vias 61 to the level of the upper row of vias 61.

The segment parts of each trace segment may however also be changed such that the first segment part runs parallel to the direction 75.1 and that the second segment part is inclined.

Again, the first conductive layer is arranged below the second conductive layer such that trace segments on the second layer are positioned above the trace segments on the first layer which is shown by interrupted lines of the trace segments on the first layer.

It is to note that the shape of the soldering pin and the shape of the trace segments may be chosen independently of each other and may be optimised for a given application.

Figure 15:
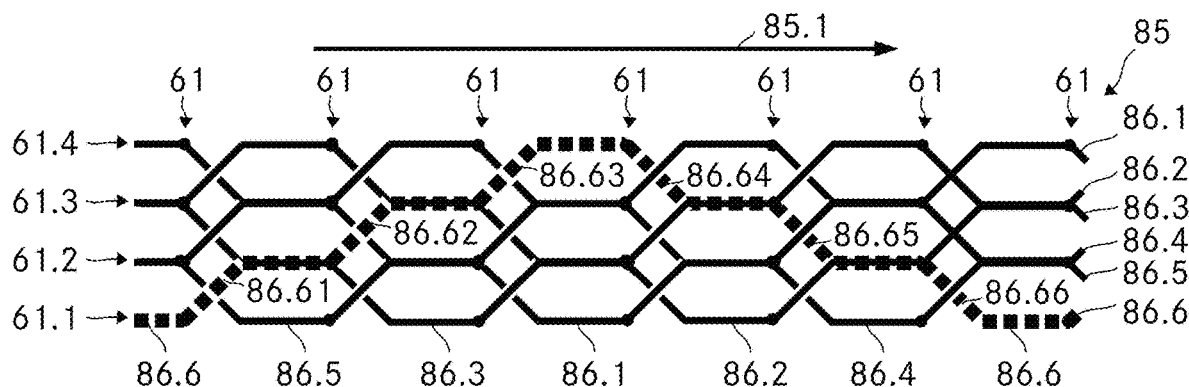
FIG. 15 a schematic representation of a part of an exemplary turn section with multiple strands and FIG. 16 a schematic representation of a part of another exemplary turn section with multiple strands.

FIG. 15 shows a schematic representation of a part of an exemplary turn section with multiple strands. The turn section 85 in this example runs in the general direction 85.1 and includes six strands 86.1, 86.2, 86.3, 86.4, 86.5, 86.6 that are provided on a PCB with four conductive layers.

By way of example, the path of the strand 86.6 is described in the following. The path of the other strands 86.1, 86.2, 86.3, 86.4, 86.5 is similar but displaced in the direction 85.1.

The vias 61 in this example are arranged in four rows 61.1, 61.2, 61.3, 61.4. A first trace segment 86.61 of the strand 86.6 is provided on the first conductive layer and runs from the level of the first row 61.1 to the level of the second row 61.2. A second trace segment 86.62 is provided on the second conductive layer below the first conductive layer and runs from the level of the second row 61.2 to the level of the third row 61.3. A third trace segment 86.63 is provided on the third conductive layer below the second conductive layer and runs from the level of the third 61.3 to the level of the fourth row 61.4. A fourth trace segment 86.64 is provided on the fourth conductive layer below the third conductive layer and runs from the level of the fourth row 61.4 back to the level of the third row 61.3. A fifth trace segment 86.65 is provided on the third conductive layer and runs from the level of the third row 61.3 back to the level of the second row 61.3. And a sixth trace segment 86.66 is provided on the second conductive layer and runs from the level of the third row 61.3 back to the level of the second row 61.3. The sequence of these six trace segments 86.61 to 86.66 forms one turn of a spiral strand section of the strand 86.6 starting and ending at the first row 61.1 on the first conductive layer. By providing several such sequences of six trance segments connected to each other results in a spiral form of the strand 86.6. As the other strands 86.1, 86.2, 86.3, 86.4, 86.5 are built in the same way, the turn section 85 includes a stranded or litz-like structure formed by the strands 86.1, 86.2, 86.3, 86.4, 86.5, 86.6.

Figure 16:
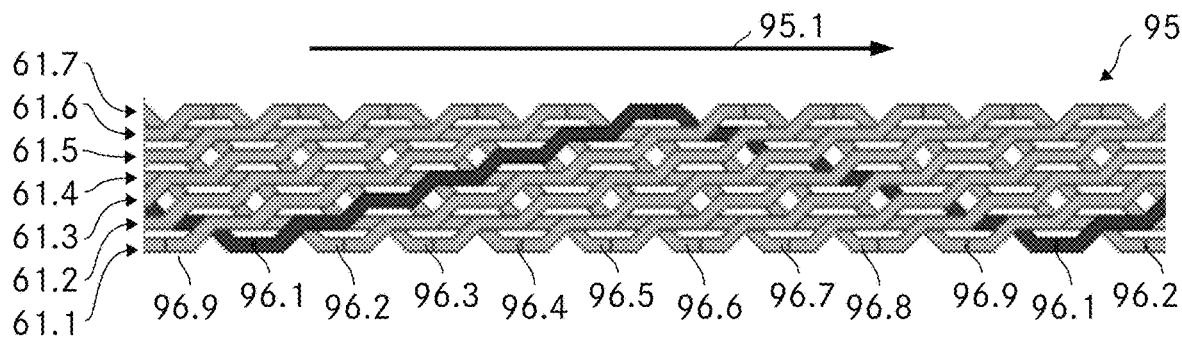

FIG. 16 shows a schematic representation of a part of another exemplary turn section 95 with multiple strands that runs in the general direction 95.1. The turn section 95 in this example includes nine strands 96.1 to 96.9 and each of them includes a number of trace segments connected to each other by vias (not shown) where the vias in this example are arranged to form seven rows 61.1 to 61.7. The strand 96.1 is emphasized to show its course through the depicted part of the turn section 95.

During the development of the invention, the following has been found for the application of a wireless charger for charging electric vehicles:

the overall width $l_{base}$ of a turn section on a PCB, i. e. the width perpendicular to the general direction of that trace section, is in the order of 5 to 10 mm, in order to avoid unwanted crosstalk or other disturbances between the strands, an isolation length of about 0.4 mm should be maintained, the width of the single trace segments of a strand is in the order of some tenth of a millimeter to some millimeters, depending for example on the number of rows of vias used to form the strands, for a given overall width $l_{base}$ of a turn section, a given isolation length $l_{iso}$ and a given number $N_{row}$ of rows of the vias, the width h of the single trace segments of a strand may for example be calculated by the formula $$l_1 = \frac{l_{base} - (N_{row} - 1)l_{iso}}{N_{row}}$$

using such litz structures for the first and second turn sections of a secondary winding reduces the losses in that secondary winding, however, the use of a structure with only two or three rows of vias may result in enhanced losses due to a higher DC-resistance and a poor resistance factor; but the use of structures with four or more rows of vias results in an overall loss reduction, due to the significantly higher number of vias for structures with more than seven rows of vias and therewith increased manufacturing costs, a structure with seven rows of vias as for example shown in FIG. 16 offers a good compromise of loss reduction and manufacturing costs, regarding the height of the single traces the losses may be significantly reduced for heights above 90 µm but only minor improvements may be achieved for heights above 120 µm, accordingly, the height of the traces is chosen to be in the order of 90 µm to 120 µm, as outlined above, due to the strong variation of the magnetic field in the Y-direction, the width of the trace segments of the strands preferably is determined individually for each turn of the coil, the width of the traces is chosen to be in the order of about 100 µm to 800 µm, thereby, the width of the traces of the first and second turn sections of an outer turn of the coil is therefore chosen to be higher than the width of the traces of the first and second turn sections respectively of an inner turn of the coil, and due to the variation of the magnetic field in the Z-direction, the width of the trace segments of the first turn section (which is farther from the transmitting coil) is chosen to be higher than the width of the trace segments of the second turn section (which is closer to the transmitting coil), compared to a conventional non-litz structure of the coil, the planar litz structure of a resonator according to the invention significantly reduces the AC-resistance of the coil of the secondary, i. e. vehicle-side resonator at the operating frequency, where the operating frequency is in the order of about 10 kHz and above.

In most examples shown and described above the strands are simply twisted against each other. It is however to note that the trace segments of the strands may also connected such as to interweave the strands into each other. In this way any desired weaving pattern of the single strands of a trace section may be created.

Furthermore, the number of conductive layers and the number of strands may be chosen such as to best meet the requirements of a particular application.

In summary, it is to be noted that the invention enables to create an inductor for a resonator of a wireless power transfer arrangement having a reduced height, may be produced at reasonable costs and exhibits reduced losses.

The invention claimed is:

1. An inductor for a resonator of a wireless power transfer arrangement, comprising:
    a coil arranged on a magnetic core having at least one turn that includes:
        a) a first turn section including a trace of a first PCB arranged on one side of the magnetic core,
        b) a second turn section including a trace of a second PCB arranged on another side of the magnetic core,
        c) a third turn section connecting a second end of the first turn section and a first end of the second turn section, and
    a linking section connecting said at least one turn to a terminal of the coil or to a neighbouring turn, wherein the third turn section and the linking section are formed by soldering pins that extend between the first PCB and the second PCB.

2. The inductor according to claim 1, wherein the magnetic core includes two yoke elements and at least one limb element magnetically connecting the yoke elements and wherein the coil is arranged on the at least one limb element.

3. The inductor according to claim 2, wherein the limb element has a strip-like shape and wherein the first and the second PCB are arranged in parallel to the limb element.

4. The inductor according to claim 1, wherein the coil has a number of turns that is at least one and below 20.

5. The inductor according to claim 1, wherein the coil has a number of turns that is above 5 and below 16.

6. The inductor according to claim 1, wherein the coil has a number of turns that is above 7 and below 14.

7. The inductor according to claim 1, wherein the first turn section includes at least two strands arranged between the first and the second end of the first turn section or the second turn section and wherein each strand includes a trace of the first PCB or the second PCB.

8. The inductor according to claim 7, wherein the first and the second PCB include multiple layers with at least one trace, and wherein each strand includes a trace on at least two layers and wherein the first and the second PCB include vias to connect the traces on different layers to each other to form the strand.

9. The inductor according to claim 8, wherein each strand includes at least two traces on each of said at least two layers and wherein the traces are arranged and connected to each other by vias that form twisted strands.

10. The inductor according to claim 1, wherein the traces have a height between 50 µm and 200 µm.

11. The inductor according to claim 1, wherein the traces have a height between 80 µm and 150 µm.

12. The inductor according to claim 1, wherein the traces have a width between 200 µm and 1000 µm, wherein the width of the second turn section of a turn is equal or smaller than the width of the first turn section of that turn.

13. The inductor according to claim 1, wherein the width of the traces of the first and second turn sections of an outer turn of the coil is higher than the width of the traces of the first and second turn sections respectively of an inner turn of the coil.

14. The inductor according to claim 1, wherein at least one of the first or the second PCB includes circuit components electrically connected to the coil forming a reactive power compensation, wherein the circuit components are mounted on a surface of the first and/or the second PCB.

15. A wireless power transfer arrangement for a wireless power transfer from a primary resonator across an airgap to a secondary resonator, wherein both the primary resonator and the secondary resonator include an inductor according to claim 1.

16. The inductor according to claim 1, wherein the linking section connects said at least one turn to a first end of a first turn section of the neighbouring turn.

17. A method for making an inductor for a resonator of a wireless power transfer arrangement, including the steps of
  a) arranging a first PCB having at least one trace on one side of a magnetic core,
  b) arranging a second PCB having at least one trace on another side of the magnetic core,
  c) providing a turn of the coil by
    using a trace of the first PCB as a first turn section of the turn,
    using a trace of the second PCB as a second turn section of the turn,
    providing a third turn section of the turn by connecting a second end of the first turn section to a first end of the second turn section and
    connecting said turn to a terminal of the coil or to a neighbouring turn, preferably to a first end of a first turn section of a neighbouring turn wherein the third turn section and the linking section are formed by soldering pins that extend between the first PCB and the second PCB.

18. The method according to claim 17, wherein the step of connecting said turn to a neighbouring turn includes connecting said turn to a first end of a first turn section of the neighbouring turn.

19. An inductor for a resonator of a wireless power transfer arrangement, comprising
  a coil arranged on a magnetic core having at least one turn that includes:
    a) a first turn section including a trace of a first PCB arranged on one side of the magnetic core,
    b) a second turn section including a trace of a second PCB arranged on another side of the magnetic core,
    c) a third turn section connecting a second end of the first turn section and a first end of the second turn section and
    d) a linking section connecting said at least one turn to a terminal of the coil or to a neighbouring turn,
  wherein
    the magnetic core includes two yoke elements and at least one limb element magnetically connecting the yoke elements, the coil being arranged on the at least one limb element,
    a distance between the first PCB and the second PCB corresponding to a thickness of the limb core element,
    and the third turn section and the linking section are formed by soldering pins that extend between the first PCB and the second PCB.

* * * * *